US012048003B2

(12) United States Patent
Golitschek Edler von Elbwart et al.

(10) Patent No.: US 12,048,003 B2
(45) Date of Patent: Jul. 23, 2024

(54) DETERMINING CHANNEL STATISTICS FOR CLEAR CHANNEL ASSESSMENTS

(71) Applicant: LENOVO (BEIJING) LIMITED, Beijing (CN)

(72) Inventors: Alexander Golitschek Edler von Elbwart, Darmstadt (DE); Joachim Loehr, Wiesbaden (DE); Prateek Basu Mallick, Dreieich (DE); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 502 days.

(21) Appl. No.: 17/279,952

(22) PCT Filed: Apr. 4, 2019

(86) PCT No.: PCT/CN2019/081543
§ 371 (c)(1),
(2) Date: Mar. 25, 2021

(87) PCT Pub. No.: WO2020/199203
PCT Pub. Date: Oct. 8, 2020

(65) Prior Publication Data
US 2022/0039156 A1 Feb. 3, 2022

(51) Int. Cl.
*H04W 74/0808* (2024.01)
(52) U.S. Cl.
CPC .............. *H04W 74/0808* (2013.01)
(58) Field of Classification Search
CPC .. H04W 74/0808; H04W 24/08; H04W 24/10
See application file for complete search history.

(56) References Cited

U.S. PATENT DOCUMENTS 10,014,970 B2   7/2018   Zhang et al.
10,064,184 B1*  8/2018   Jorgovanovic .... H04W 72/0453
(Continued)

FOREIGN PATENT DOCUMENTS

CN   108353426 A   7/2018
EP     3054737 A   8/2016
(Continued)

OTHER PUBLICATIONS

International Searching Authority, "Notification of Transmittal of the International Search Report and the Written Opinion of the International Searching Authority, or the Declaration", PCT/CN2019/081543, dated Apr. 4, 2019, pp. 1-6.

*Primary Examiner* — Afshawn M Towfighi
(74) *Attorney, Agent, or Firm* — Kunzler Bean & Adamson

(57) ABSTRACT

Apparatuses, methods, and systems are disclosed for determining channel statistics for clear channel assessments. One method (900) includes determining (902), by an apparatus (102), channel statistics corresponding to a plurality of listen-before-talk channel access types, a plurality of channel access priorities, a plurality of frequency ranges, or some combination thereof. The channel statistics indicate whether clear channel assessments for transmission on a shared resource are successful. The method (900) includes transmitting (904) information corresponding to the channel statistics to a network device.

18 Claims, 6 Drawing Sheets

(56) References Cited

U.S. PATENT DOCUMENTS

| | | | |
|---|---|---|---|
| 11,751,245 B2* | 9/2023 | Agiwal | H04W 76/28 |
| | | | 370/329 |
| 2015/0245232 A1* | 8/2015 | Luo | H04L 5/0053 |
| | | | 370/252 |
| 2015/0263837 A1 | 9/2015 | Patel et al. | |
| 2016/0270100 A1* | 9/2016 | Ng | H04L 5/008 |
| 2017/0048880 A1* | 2/2017 | Anderson | H04W 72/1268 |
| 2018/0139767 A1* | 5/2018 | Lee | H04W 16/14 |
| 2018/0184475 A1* | 6/2018 | Babaei | H04W 16/14 |
| 2018/0368205 A1* | 12/2018 | Park | H04W 76/30 |
| 2020/0221309 A1* | 7/2020 | Ozturk | H04W 74/0833 |
| 2020/0235788 A1* | 7/2020 | Rajagopal | H04B 7/0848 |
| 2022/0039156 A1* | 2/2022 | Golitschek Edler von Elbwart | H04W 74/0808 |

FOREIGN PATENT DOCUMENTS

| | | | |
|---|---|---|---|
| WO | 2016168507 A1 | 10/2016 | |
| WO | 2019055137 A1 | 3/2019 | |

\* cited by examiner

DETERMINING CHANNEL STATISTICS FOR CLEAR CHANNEL ASSESSMENTS

FIELD

The subject matter disclosed herein relates generally to wireless communications and more particularly relates to determining channel statistics for clear channel assessments.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Component Carrier ("CC"), Code Division Multiplexing ("CDM"), Control Element ("CE"), Coordinated Multipoint ("CoMP"), Categories of Requirements ("CoR"), Control Plane ("CP"), Channel Occupancy Ratio ("CR"), CSI-RS Resource Indicator ("CRI"), Cell RNTI ("C-RNTI"), Channel State Information ("CSI"), Channel Quality Indicator ("CQI"), Central Unit ("CU"), Codeword ("CW"), Downlink Control Information ("DCI"), Downlink ("DL"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced PDCCH ("EPDCCH"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), License Assisted Access ("LAA"), Listen-Before-Talk ("LBT"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Medium Access Control ("MAC"), Modulation Coding Scheme ("MCS"), Multiple Input Multiple Output ("MIMO"), Mobile-Termination ("MT"), Machine Type Communication ("MTC"), Multi-User ("MU"), Multi-User MIMO ("MU-MIMO"), Negative-Acknowledgment ("NACK") or ("NAK"), Next Generation ("NG"), Next Generation Node B ("gNB"), New Radio ("NR"), NR Unlicensed ("NR-U"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Physical Layer ("PHY"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Radio Resource Management ("RRM"), Reference Signal ("RS"), Reference Signal Received Power ("RSRP"), Reference Signal Received Quality ("RSRQ"), Received Signal Strength Indicator ("RSSI"), Receive ("RX"), Secondary Cell ("SCell"), Sub Carrier Spacing ("SCS"), Service Data Unit ("SDU"), Subscriber Identity Module ("SIM"), Signal-to-Interference and Noise Ratio ("SINR"), Sidelink ("SL"), Sequence Number ("SN"), Scheduling Request ("SR"), SRS Resource Indicator ("SRI"), Sounding Reference Signal ("SRS"), Synchronization Signal ("SS"), SS/PBCH Block ("SSB"), Transmission Block ("TB"), Transmission Control Information ("TCI"), Time Division Duplex ("TDD"), Temporary Mobile Subscriber Identity ("TMSI"), Transmitted Precoding Matrix Indicator ("TPMI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), and Zero Power ("ZP"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, clear channel assessments may be made. In such networks, the clear channel assessments may be made to determine whether a channel is available for transmission.

BRIEF SUMMARY

Methods for determining channel statistics for clear channel assessments are disclosed. Apparatuses and systems also perform the functions of the apparatus. In one embodiment, the method includes determining, by an apparatus, channel statistics corresponding to a plurality of listen-before-talk channel access types, a plurality of channel access priorities, a plurality of frequency ranges, or some combination thereof. In such an embodiment, the channel statistics indicate whether clear channel assessments for transmission on a shared resource are successful. In certain embodiments, the method includes transmitting information corresponding to the channel statistics to a network device.

An apparatus for determining channel statistics for clear channel assessments, in one embodiment, includes a processor that determines channel statistics corresponding to a plurality of listen-before-talk channel access types, a plurality of channel access priorities, a plurality of frequency ranges, or some combination thereof. In certain embodiments, the channel statistics indicate whether clear channel assessments for transmission on a shared resource are successful. In some embodiments, the apparatus includes a transmitter that transmits information corresponding to the channel statistics to a network device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
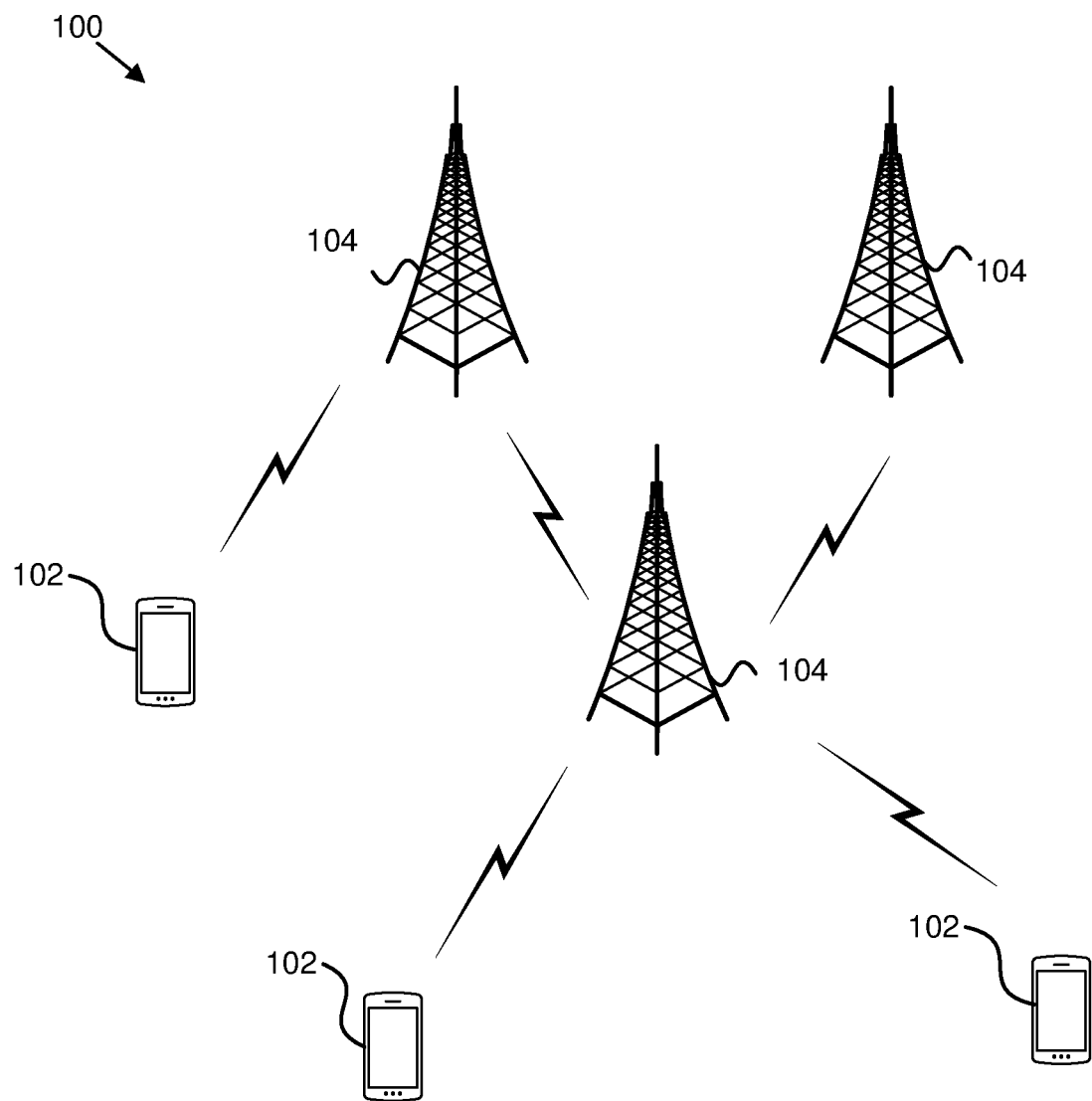
FIG. 1 is a schematic block diagram illustrating one embodiment of a wireless communication system for determining channel statistics for clear channel assessments.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code.

The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining channel statistics for clear channel assessments. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine channel statistics corresponding to a plurality of listen-before-talk channel access types, a plurality of channel access priorities, a plurality of frequency ranges, or some combination thereof. In such embodiments, the channel statistics indicate whether clear channel assessments for transmission on a shared resource are successful. In certain embodiments, the remote unit 102 may transmit information corresponding to the channel statistics to a network device (e.g., the network unit 104). Accordingly, a remote unit 102 may be used for determining channel statistics for clear channel assessments.

Figure 2:
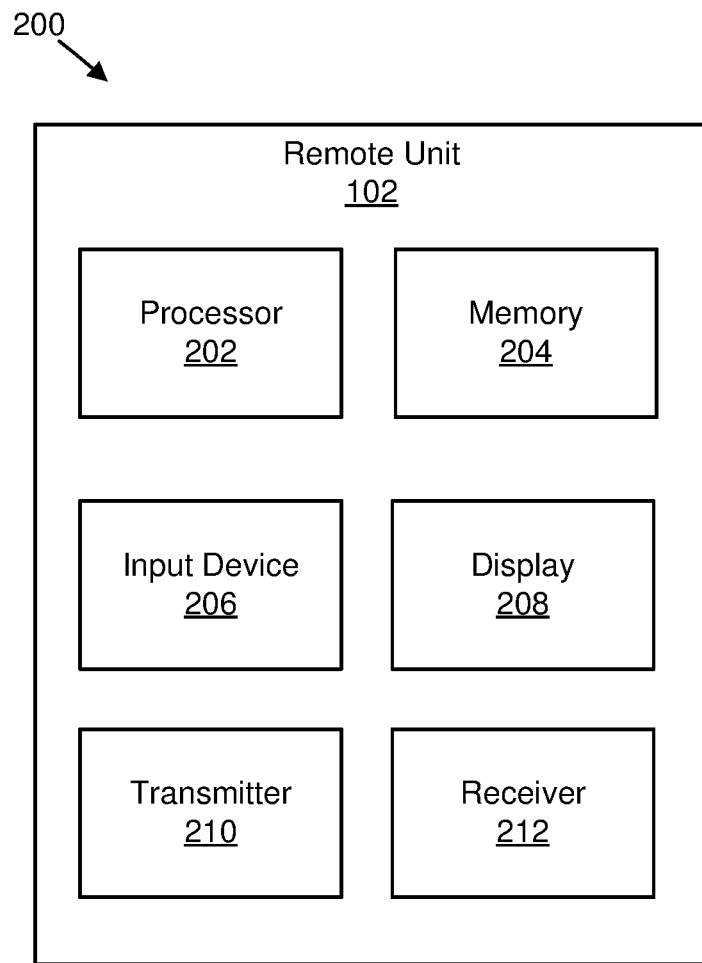
FIG. 2 is a schematic block diagram illustrating one embodiment of an apparatus that may be used for determining channel statistics for clear channel assessments.

FIG. 2 depicts one embodiment of an apparatus 200 that may be used for determining channel statistics for clear channel assessments. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In some embodiments, the processor 202 may determine channel statistics corresponding to a plurality of listen-before-talk channel access types, a plurality of channel access priorities, a plurality of frequency ranges, or some combination thereof. In such embodiments, the channel statistics may indicate whether clear channel assessments for transmission on a shared resource are successful. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the transmitter 210 transmits information corresponding to the channel statistics to a network device (e.g., the network unit 104).

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
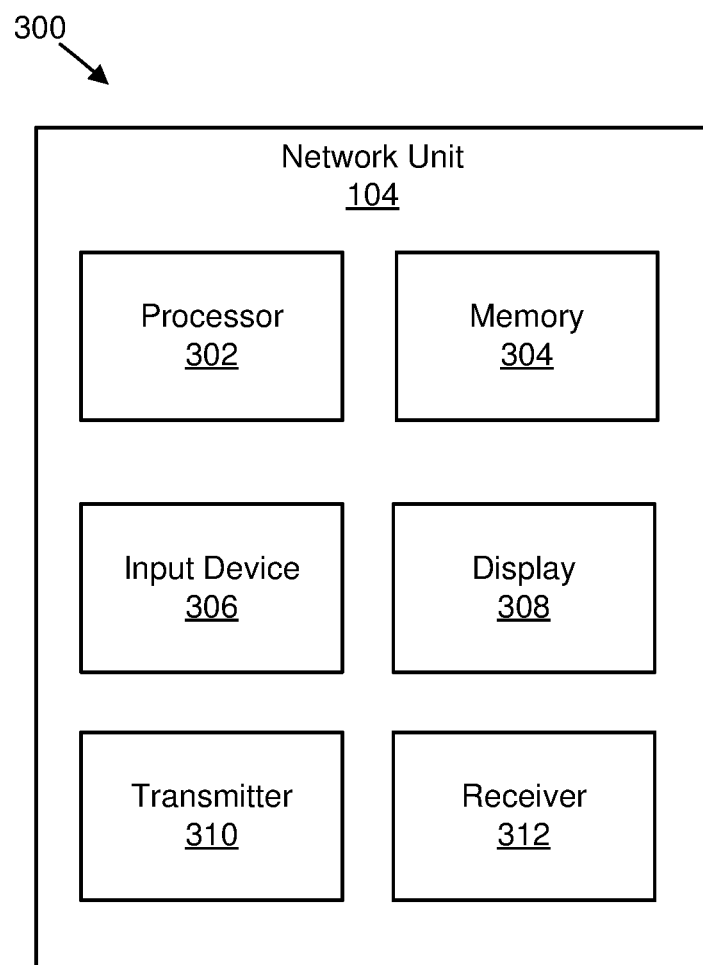
FIG. 3 is a schematic block diagram illustrating one embodiment of an apparatus that may be used for receiving information corresponding to channel statistics.

FIG. 3 depicts one embodiment of an apparatus 300 that may be used for receiving information corresponding to channel statistics. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives information corresponding to channel statistics. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, an unlicensed cell may be loaded due to interference that is not within the control of a serving operator. In various embodiments, it may be beneficial to take interference that is not within the control of a serving operator into account for RRM and/or scheduling. In certain embodiments, periodic measurements of channel occupancy and RSSI may be useful for NR-U.

In various embodiments, if channel occupancy is high, there may be a high risk that a node is not able to access the channel at a given time (e.g., a UE—such as the remote unit 102—may experience a high number of unsuccessful transmission attempts). In certain embodiments, due to hidden nodes and signal propagation properties, different nodes (e.g., such as a gNB or a UE, or different UEs) will generally observe a different channel occupancy and, therefore, have different transmission attempt statistics. For example, a gNB may observe a very low channel occupancy and successfully access the channel frequently, while a UE served by the gNB may observe a very high channel occupancy due to transmissions from nearby gNBs of the same or different operator, or from nearby nodes of a different communication system such as Wi-Fi nodes, resulting in a high number or ratio of unsuccessful transmission attempts.

In some embodiments, unlicensed cells experiencing high occupancy or congestion may have a negative impact on cell throughput as well as on user data throughput in general. Moreover, in various embodiments, UL procedures, such as LCP or UL transmission, may be negatively affected if granted resources cannot be used due to channel access failures. In such embodiments, TBs may be generated for transmission on an unlicensed cell, and PDCP data packets may be routed to unlicensed cells even though actual transmission on a PHY may not occur due to the channel access procedure. In certain embodiments, a centralized scheduler may obtain reports regarding successful and/or unsuccessful transmission attempts from a served UEs.

In various embodiments, there may be two or more channel access types defined (e.g., Type 1 and Type 2) that dictate how the transmitter performs channel access as defined in Sections 4.1.1 and 4.2.1 of TS 37.213, v15.1.0, which is incorporated by reference herein. Moreover, a channel access priority class may be defined as described in TS 37.213 Tables 4.1.1-1 and 4.2.1-1. As may be appreciated, a UE may use a Type 1 channel access procedure for transmitting transmissions including a PUSCH transmission on autonomous UL resources unless stated otherwise. Moreover, as may be appreciated, the UE may use a Type 2 channel access procedure for transmitting transmissions including a PUSCH transmission unless stated otherwise. Alternatively, the UE may be instructed with information that indicates which channel access procedure type and/or channel access priority class by an indication transmitted by a gNB, such as a resource grant.

In some embodiments, a common property of DL and UL channel access may be the use of a contention window in a channel access procedure for Type 1 UL, as well as for DL transmissions including PDSCH, PDCCH, and/or EPDCCH. In certain embodiments, transmissions may employ a channel access scheme that allows channel access if a transmitter has been sensing the channel to be idle for at least a sensing interval of 25 µs immediately before transmitting. In various embodiments, a CR may be defined in Section 5.1.31 of TS 36.214 v15.3.0, which is incorporated by reference herein.

As may be appreciated, because channel access rules are different depending on transmitted content (e.g., contention window based channel access vs 25 µs based channel access) and a contention window size is generally different for different channel access priority classes, a simple or single LBT failure statistics may give an incomplete or inaccurate picture of a channel situation. For example, LBT may fail more easily if a contention window size is large (e.g., there may not be a sufficient number of idle slots until a transmission occurs based on a resource grant), even though for the same transmission resource LBT may succeed if the contention window is smaller or just a 25 µs idle channel is observed.

As used herein, the term "statistics" or "channel statistics" may refer to any metric (e.g., measured, derived, reported, etc.) that is suitable for assessing a channel occupancy or LBT failure.

Figure 4:
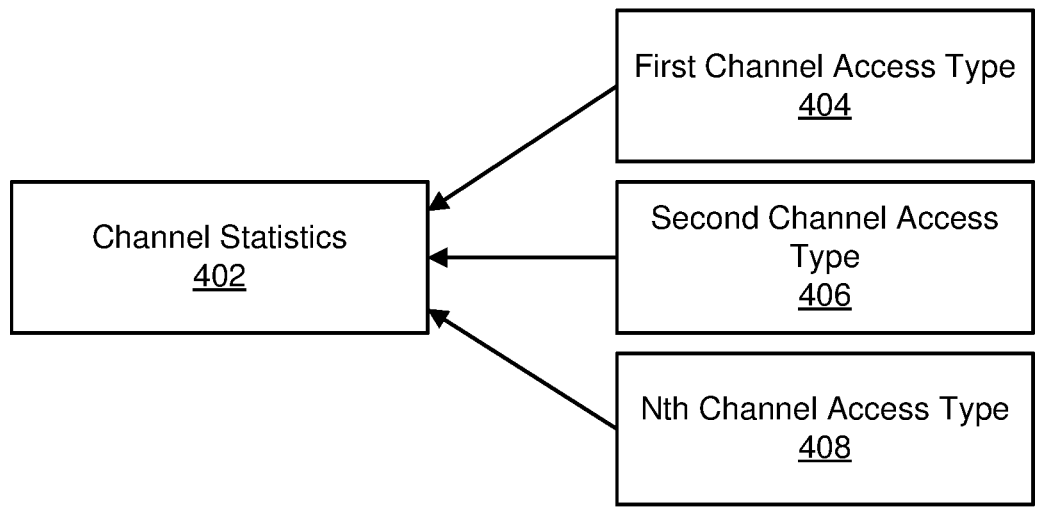
FIG. 4 is a schematic block diagram illustrating one embodiment of a system for determining channel statistics for clear channel assessments.

FIG. 4 is a schematic block diagram illustrating one embodiment of a system 400 for determining channel statistics 402 for clear channel assessments. In one embodiment, the remote unit 102 (e.g., a UE) obtains and/or reports individual statistics for different channel access types. As illustrated, the channel statistics 402 include statistics for a first channel access type 404 (e.g., a Type 1 UL channel access procedure), a second channel access type 406 (e.g., a Type 2 UL channel access procedure), and/or an nth channel access type 408. As may be appreciated, the channel statistics 402 may include statistics for two or more different channel access types, up to an nth number of channel access types.

Figure 5:
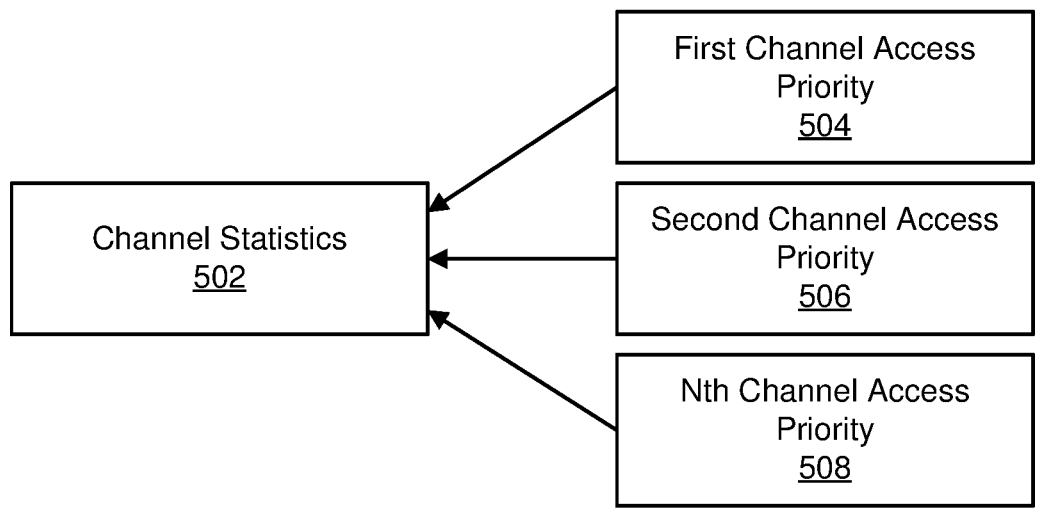
FIG. 5 is a schematic block diagram illustrating another embodiment of a system for determining channel statistics for clear channel assessments.

FIG. 5 is a schematic block diagram illustrating another embodiment of a system 500 for determining channel statistics 502 for clear channel assessments. In some embodiments, the remote unit 102 (e.g., a UE) obtains and/or reports individual statistics for different channel access priorities (e.g., priority classes). As illustrated, the channel statistics 502 include statistics for a first channel access priority 504 (e.g., a channel access priority class 1), a second channel access priority 506 (e.g., a channel access priority class 2), and/or an nth channel access priority 508 (e.g., a channel access priority class 3, a channel access priority class 4, etc.). As may be appreciated, the channel statistics 502 may include statistics for two or more different channel access priorities, up to an nth number of channel access priorities.

Figure 6:
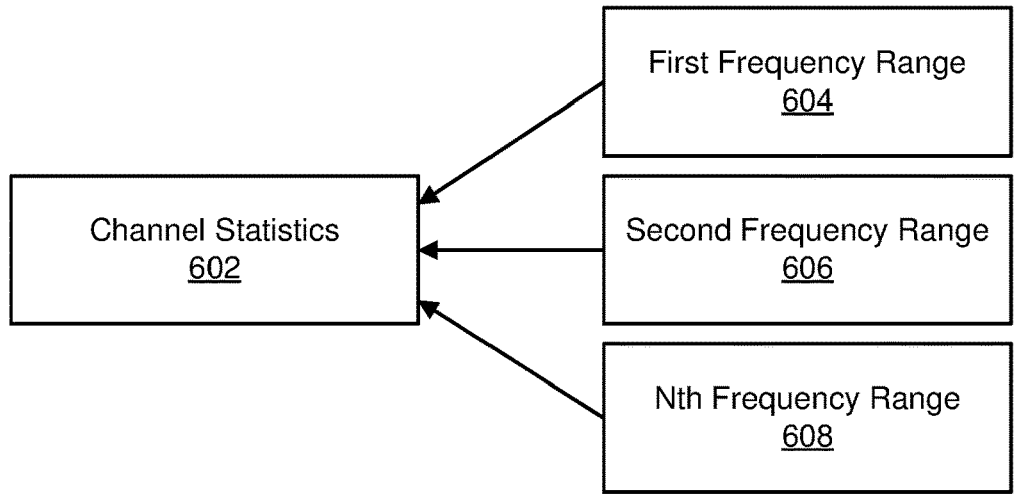
FIG. 6 is a schematic block diagram illustrating a further embodiment of a system for determining channel statistics for clear channel assessments.

FIG. 6 is a schematic block diagram illustrating a further embodiment of a system 600 for determining channel statistics 602 for clear channel assessments. In certain embodiments, the remote unit 102 (e.g., a UE) obtains and/or reports individual statistics for different frequency ranges (e.g., different LBT bandwidth units). As illustrated, the channel statistics 602 include statistics for a first frequency range 604 (e.g., a first 20 MHz frequency range), a second frequency range 606 (e.g., a second 20 MHz frequency range), and/or an nth frequency range 608 (e.g., a third 20 MHz frequency range, a fourth 20 MHz frequency range, etc.). As may be appreciated, the channel statistics 602 may include statistics for two or more different frequency ranges, up to an nth number of frequency ranges.

For example, for compatibility reasons with LTE-LAA or Wi-Fi systems, the LBT may be performed in bandwidth units of 20 MHz each, even though an NR-U cell may be 100 MHz wide. Moreover, on one 20 MHz bandwidth unit of the 100 MHz cell, a UE transmitting to an LTE-LAA node may occupy the channel, while the remaining 80 MHz may be idle and available for use by an NR UE. Accordingly, statistics may be obtained and/or reported individually for each of the 20 MHz bandwidth units of the 100 MHz cell (e.g., the first 20 MHz bandwidth, the second 20 MHz bandwidth, the third 20 MHz bandwidth, the fourth 20 MHz bandwidth, and the fifth 20 MHz bandwidth). As may be appreciated, a bandwidth unit (e.g., frequency range) may consist of an LBT-subband having a predefined bandwidth, one or more NR BWPs, or a cell BW. In some embodiments, separate statistics may be obtained and/or reported for individual beams.

In certain embodiments, channel statistics may exclude channel occupancy if no channel access is being attempted by a node. In such embodiments, channel statistics may include a ratio of idle sensing periods to (e.g., divided by) a total time of sensed periods. Accordingly, slots that are not being sensed as part of a channel access procedure are not used for the statistics. As used herein, a sensing period may be a slot as defined for transmission in NR (e.g., which depends on a subcarrier spacing) and/or may include a sensing slot duration $T_{sl}$, a defer duration $T_d$, a duration $T_f$=16 μs, and/or a duration $T_{short-ul}$=25 μs. Accordingly, in some embodiments, channel statistics may be obtained only if the UE is sensing a channel for channel access purposes.

In various embodiments, channel statistics may include a ratio of idle sensing periods to (e.g., divided by) a predetermined (e.g., predefined) time period. The predetermined time period may be configured by RRC in a broadcast, groupcast, or unicast fashion by a gNB. As may be appreciated, such embodiments may require the channel to be sensed for obtaining statistics during periods in which the channel would not be sensed otherwise (e.g., for channel access purposes). By using the predetermined time period instead of the total time of sensed periods, channel statistics between different measuring and/or reporting nodes may be compared to one another because they use the same time period as part of the ratio.

In some embodiments, channel statistics may include an average time until channel access is obtained. For example, the average time until channel access is obtained may be determined based on a number of sensing periods prior to a transmission (this includes idle as well as busy sensing periods). As may be appreciated, because NR supports different offsets between transmission of an UL grant and a corresponding UL transmission, such a metric may help a scheduler to determine offsets so that channel access is more likely to succeed for a granted resource, thereby allowing the transmission to be performed.

In certain embodiments, channel statistics may include a number of failed transmission attempts (or channel access attempts) over (e.g., divided by) a total number of transmission attempts (or channel access attempts) during a predetermined time period. Accordingly, only transmission attempts are counted, and the sensing periods involved during channel access are not counted.

In various embodiments, a UE determining channel statistics may ignore (or not measure) sensing periods during which it is aware of a serving gNB's transmission. Because the serving gNB is assigning scheduling resources, the serving gNB can be assumed to not assign transmission resources to any UE if it intends to transmit itself. Therefore, it may be beneficial if the serving gNB's channel occupancy is excluded from the channel statistics. In some embodiments, a UE may obtain information about a serving gNB's channel occupancy from a channel (e.g., a PDCCH, DCI, etc.) that conveys information about the channel occupancy structure, or by detecting the presence of gNB-specific signals such as DM-RS. In various embodiments, a UE determining channel statistics may ignore (or not measure) sensing periods during which it is aware of another UE's transmission. In such embodiments, the UE may know about another UE's transmission from information transmitted by the gNB or from other UEs. In certain embodiments, a gNB may explicitly indicate periods that a UE may ignore (or not ignore). Such embodiments may be like a blacklist (e.g., time periods to ignore channel statistics) or whitelist (e.g., time periods to capture channel statistics), which may be conveyed by an RRC message.

Figure 7:
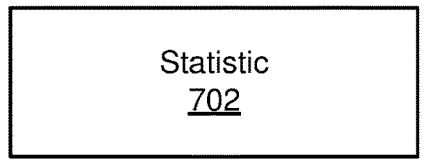
FIG. 7 is a schematic block diagram illustrating one embodiment of format for information corresponding to channel statistics.

FIG. 7 is a schematic block diagram illustrating one embodiment of format 700 for information corresponding to channel statistics. The format 700 (e.g., a short report format) includes only one statistic 702 (e.g., channel statistic). To use the format 700 for reporting multiple statistics, a UE would need to transmit multiple reports based on the format 700 in different time instances.

Figure 8:
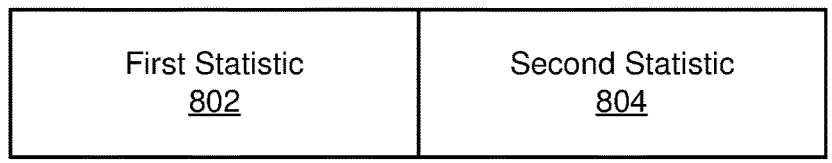
FIG. 8 is a schematic block diagram illustrating another embodiment of format for information corresponding to channel statistics.

FIG. 8 is a schematic block diagram illustrating another embodiment of format 800 for information corresponding to channel statistics. The format 800 (e.g., a long report format) includes a first statistic 802 (e.g., channel statistic) and a second statistic 804 (e.g., channel statistic). For example, in various embodiments, the format 800 may include the first statistic 802 for Type 1 channel access and the second statistic 804 for Type 2 channel access. In some embodiments, the format 800 may include any number of statistics greater than two. In certain embodiments, a UE may use either the format 700 or the format 800 to report channel statistics to the gNB.

In certain embodiments, a gNB may configure which out of a plurality of channel statistics a UE is to report in a short report format (e.g., the format 700) or a long report format (e.g., the format 800). For example, the gNB may configure channel statistics including a channel access type, a priority class, a frequency range, and/or a cell. The configuration from the gNB may indicate which of the channel statistics to report.

In various embodiments, a UE may indicate as part of a report which channel statistics are being reported. For example, the UE may indicate channel statistics including a channel access type, a priority class, a frequency range, and/or a cell. The indication may represent which of the channel statistics are reported.

Figure 9:
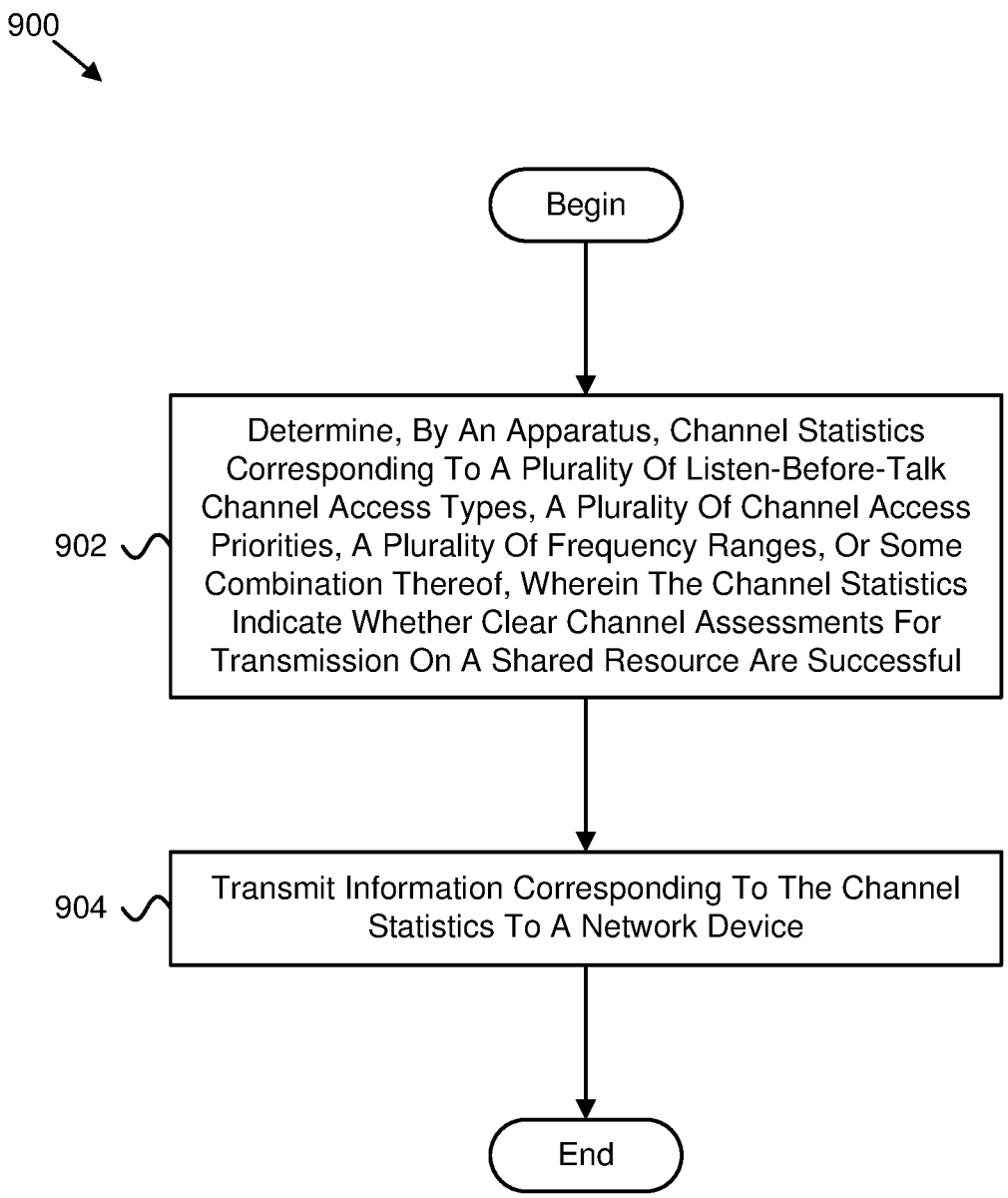
FIG. 9 is a schematic flow chart diagram illustrating one embodiment of a method for determining channel statistics for clear channel assessments.

FIG. 9 is a schematic flow chart diagram illustrating one embodiment of a method 900 for determining channel statistics for clear channel assessments. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include determining 902, by an apparatus, channel statistics corresponding to a plurality of listen-before-talk channel access types, a plurality of channel access priorities, a plurality of frequency ranges, or some combination thereof. In certain embodiments, the channel statistics indicate whether clear channel assessments for transmission on a shared resource are successful. In certain embodiments, the method 900 includes transmitting 904 information corresponding to the channel statistics to a network device.

In certain embodiments, determining the channel statistics comprises sensing whether the shared resource is idle or busy. In some embodiments, sensing whether the shared resource is idle or busy comprises sensing if the apparatus is to perform a transmission on the shared resource, sensing if the apparatus is performing a clear channel assessment, or a combination thereof. In various embodiments, the channel statistics comprise a first ratio comprising a first time period comprising idle sensing periods divided by a total time period for sensing, a second ratio comprising the first time period divided by a predetermined time period, or some combination thereof.

In one embodiment, the channel statistics comprise a time from a start of a clear channel assessment until the clear channel assessment is successful. In certain embodiments, the channel statistics comprise a first ratio comprising a first number of successful channel access attempts divided by a number of channel access attempts, a second ratio comprising a second number of unsuccessful channel access attempts divided by the number of channel access attempts, a third ratio comprising the first number of successful channel access attempts in a predetermined time period, a fourth ratio comprising the second number of unsuccessful channel access attempts in the predetermined time period, or some combination thereof. In some embodiments, the channel statistics disregard sensing periods during which the network device is performing transmissions.

In various embodiments, the information corresponds to a first format or a second format, the first format is different from the second format, and the first format comprises a larger amount of information than the second format. In one embodiment, the information comprises an identifier for each type of information of the information, and the identifier indicates whether the type of information corresponds to the plurality of listen-before-talk channel access types, the plurality of channel access priorities, or the plurality of frequency ranges. In certain embodiments, the method 900 further comprises receiving an indication to transmit the information.

In some embodiments, the indication comprises an identifier for each type of information of the information, and the identifier indicates whether the type of information corresponds to the plurality of listen-before-talk channel access types, the plurality of channel access priorities, or the plurality of frequency ranges.

In one embodiment, a method comprises: determining, by an apparatus, channel statistics corresponding to a plurality of listen-before-talk channel access types, a plurality of channel access priorities, a plurality of frequency ranges, or some combination thereof, wherein the channel statistics indicate whether clear channel assessments for transmission on a shared resource are successful; and transmitting information corresponding to the channel statistics to a network device.

In certain embodiments, determining the channel statistics comprises sensing whether the shared resource is idle or busy.

In some embodiments, sensing whether the shared resource is idle or busy comprises sensing if the apparatus is to perform a transmission on the shared resource, sensing if the apparatus is performing a clear channel assessment, or a combination thereof.

In various embodiments, the channel statistics comprise a first ratio comprising a first time period comprising idle sensing periods divided by a total time period for sensing, a second ratio comprising the first time period divided by a predetermined time period, or some combination thereof.

In one embodiment, the channel statistics comprise a time from a start of a clear channel assessment until the clear channel assessment is successful.

In certain embodiments, the channel statistics comprise a first ratio comprising a first number of successful channel access attempts divided by a number of channel access attempts, a second ratio comprising a second number of unsuccessful channel access attempts divided by the number of channel access attempts, a third ratio comprising the first number of successful channel access attempts in a predetermined time period, a fourth ratio comprising the second number of unsuccessful channel access attempts in the predetermined time period, or some combination thereof.

In some embodiments, the channel statistics disregard sensing periods during which the network device is performing transmissions.

In various embodiments, the information corresponds to a first format or a second format, the first format is different from the second format, and the first format comprises a larger amount of information than the second format.

In one embodiment, the information comprises an identifier for each type of information of the information, and the identifier indicates whether the type of information corresponds to the plurality of listen-before-talk channel access types, the plurality of channel access priorities, or the plurality of frequency ranges.

In certain embodiments, the method further comprises receiving an indication to transmit the information.

In some embodiments, the indication comprises an identifier for each type of information of the information, and the identifier indicates whether the type of information corresponds to the plurality of listen-before-talk channel access types, the plurality of channel access priorities, or the plurality of frequency ranges.

In one embodiment, an apparatus comprises: a processor that determines channel statistics corresponding to a plurality of listen-before-talk channel access types, a plurality of channel access priorities, a plurality of frequency ranges, or some combination thereof, wherein the channel statistics indicate whether clear channel assessments for transmission on a shared resource are successful; and a transmitter that transmits information corresponding to the channel statistics to a network device.

In certain embodiments, the processor determines the channel statistics by sensing whether the shared resource is idle or busy.

In some embodiments, the processor senses whether the shared resource is idle or busy by sensing if the apparatus is to perform a transmission on the shared resource, sensing if the apparatus is performing a clear channel assessment, or a combination thereof.

In various embodiments, the channel statistics comprise a first ratio comprising a first time period comprising idle sensing periods divided by a total time period for sensing, a second ratio comprising the first time period divided by a predetermined time period, or some combination thereof.

In one embodiment, the channel statistics comprise a time from a start of a clear channel assessment until the clear channel assessment is successful.

In certain embodiments, the channel statistics comprise a first ratio comprising a first number of successful channel access attempts divided by a number of channel access attempts, a second ratio comprising a second number of unsuccessful channel access attempts divided by the number of channel access attempts, a third ratio comprising the first number of successful channel access attempts in a predetermined time period, a fourth ratio comprising the second number of unsuccessful channel access attempts in the predetermined time period, or some combination thereof.

In some embodiments, the channel statistics disregard sensing periods during which the network device is performing transmissions.

In various embodiments, the information corresponds to a first format or a second format, the first format is different from the second format, and the first format comprises a larger amount of information than the second format.

In one embodiment, the information comprises an identifier for each type of information of the information, and the identifier indicates whether the type of information corresponds to the plurality of listen-before-talk channel access types, the plurality of channel access priorities, or the plurality of frequency ranges.

In certain embodiments, the apparatus further comprises a receiver that receives an indication to transmit the information.

In some embodiments, the indication comprises an identifier for each type of information of the information, and the identifier indicates whether the type of information corresponds to the plurality of listen-before-talk channel access types, the plurality of channel access priorities, or the plurality of frequency ranges.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving, from a base station, a configuration indicating which channel statistics corresponding to listen-before-talk (LBT) failures that occur at the UE are to be reported, and the channel statistics comprises a number of failed channel access attempts that occur at the UE;
determining occurrence of the number of failed channel access attempts at the UE as a result of LBT failures; and
reporting, to the base station, an indication of the channel statistics.

2. The method of claim 1, further comprising determining the channel statistics based on sensing whether a shared channel is idle or busy.

3. The method of claim 2, further comprising sensing whether the UE is to perform a transmission on the shared channel.

4. The method of claim 1, wherein the channel statistics comprise a ratio between a number of idle sensing periods and a total period for sensing.

5. The method of claim 1, wherein the channel statistics are indicative of a time between a start of a clear channel assessment (CCA) and an end of the CCA, wherein the end of the CCA corresponds to a successful CCA, and wherein the CCA comprises the LBT.

6. The method of claim 1, wherein the channel statistics comprise a first ratio between a first number of successful channel access attempts and a total number of channel access attempts, a second ratio between a second number of unsuccessful channel access attempts and the total number of channel access attempts, or both.

7. The method of claim 1, wherein the channel statistics exclude sensing periods, in which the base station is performing transmissions.

8. The method of claim 1, wherein the indication comprises a first format or a second format different from the first format, and wherein the first format includes a greater amount of information than the second format.

9. The method of claim 1, wherein, reporting the indication, comprises transmitting the indication to the base station.

10. A user equipment (UE), comprising:
at least one memory; and
at least one processor coupled with the at least one memory and configured to cause the UE to:
receive, from a base station, a configuration indicating which channel statistics corresponding to listen-before-talk (LBT) failures that occur at the UE are to be reported, and the channel statistics comprises a number of failed channel access attempts that occur at the UE;
determine occurrence of the number of failed channel access attempts at the UE as a result of LBT failures; and
report, to the base station, an indication of the channel statistics.

11. The UE of claim 10, wherein the at least one processor is configured to cause the UE to determine the channel statistics by sensing whether a shared channel is idle or busy.

12. The UE of claim 11, wherein the at least one processor is configured to cause the UE to sense whether the UE is to perform a transmission on the shared channel.

13. The UE of claim 10, wherein the channel statistics comprise a ratio between a number of idle sensing periods and a total period for sensing.

14. The UE of claim 10, wherein the channel statistics is indicative of a time between a start of a clear channel assessment (CCA) and an end of the CCA, wherein the end of the CCA corresponds to a successful CCA, and wherein the CCA comprises an LBT.

15. The UE of claim 10, wherein the channel statistics comprise a first ratio between a first number of successful channel access attempts and a total number of channel access attempts, a second ratio between a second number of unsuccessful channel access attempts and the total number of channel access attempts, or both.

16. The UE of claim 10, wherein the channel statistics exclude sensing periods, in which the base station is performing transmissions.

17. The UE of claim 10, wherein the indication comprises a first format or a second format different from the first format, and wherein the first format includes a greater amount of information than the second format.

18. The UE of claim 10, wherein, to report the indication, the at least one processor is configured to cause the UE to transmit the indication to the base station.

* * * * *